United States Patent [19]
Ogawa et al.

[11] Patent Number: 6,089,017
[45] Date of Patent: Jul. 18, 2000

[54] EXHAUST GAS PURIFICATION SYSTEM OF INTERNAL COMBUSTION ENGINE

[75] Inventors: Ken Ogawa; Isao Komoriya, both of Wako, Japan

[73] Assignee: Honda Giken Kogoyo Kabushiki Kaisha, Tokyo, Japan

[21] Appl. No.: 09/133,317

[22] Filed: Aug. 13, 1998

[30]  Foreign Application Priority Data

Aug. 14, 1997 [JP] Japan .................................. 9-233329

[51] Int. Cl.[7] ............................................. F01N 3/00
[52] U.S. Cl. ............................... 60/285; 60/274; 60/276; 60/277; 60/290; 123/672; 123/676; 701/103
[58] Field of Search .............................. 60/285, 277, 301, 60/276, 274, 284, 278, 290; 701/103, 108, 115; 123/676, 672, 687, 674

[56]  References Cited

U.S. PATENT DOCUMENTS

| | | |
|---|---|---|
| 5,158,063 | 10/1992 | Hosoda et al. . |
| 5,326,735 | 7/1994 | Itoh et al. . |
| 5,357,749 | 10/1994 | Ohsuga et al. . |
| 5,402,641 | 4/1995 | Katoh et al. . |
| 5,487,268 | 1/1996 | Itoh et al. . |
| 5,501,074 | 3/1996 | Suetsugu et al. .......................... 60/285 |
| 5,544,639 | 8/1996 | Shouda et al. . |
| 5,609,023 | 3/1997 | Katoh et al. . |
| 5,613,360 | 3/1997 | Iwai et al. ................................. 60/284 |
| 5,661,972 | 9/1997 | Katoh et al. . |
| 5,678,402 | 10/1997 | Kitagawa et al. . |
| 5,950,419 | 9/1999 | Nishimura et al. ....................... 60/274 |

FOREIGN PATENT DOCUMENTS 0 591 744   4/1994   European Pat. Off. .

OTHER PUBLICATIONS

Patent Abstracts of Japan, vol. 096, No. 003, Mar. 29, 1996 & JP 07 305647, Nov. 21, 1995 & U.S. Patent No. 5,661,972.

Patent Abstracts of Japan, vol. 096, No. 002, Feb. 29, 1996 & JP 07 259625, Oct. 9, 1995 & U.S. Patent No. 5,678,402.

*Primary Examiner*—Thomas Denion
*Assistant Examiner*—Binh Tran
*Attorney, Agent, or Firm*—Arent Fox Kintner Plotkin & Kahn

[57]  ABSTRACT

An engine exhaust gas purification system having a catalyst in an exhaust system of the engine, said catalyst reducing nitrogen oxide when exhaust gas generated by the engine is in an oxidizing state. In the system, engine operating parameters, including at least an engine speed and an engine load, are determined and catalyst temperature is determined, and air/fuel ratio is controlled in response to the detected parameters and the determined catalyst temperature, thereby enabling the catalyst to purify NOx in its optimum temperature characteristic range to achieve enhanced NOx constituent purification performance in an oxidizing environment. Alternatively, the air/fuel ratio is controlled in the stoichiometric or richer direction when the catalyst temperature is high, thereby protecting the catalyst from being damaged. The catalyst is a selective-reduction type nitrogen oxide reduction catalyst.

20 Claims, 11 Drawing Sheets

FIG.8

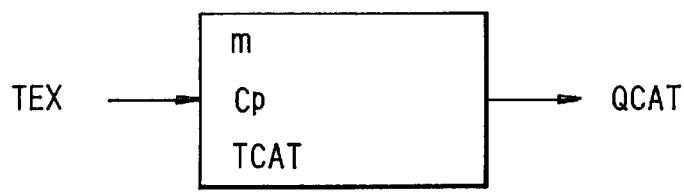

$$\Delta QCAT = m \cdot Cp \cdot (TCAT(k) - TCAT(k-1))$$
$$= A \cdot h \cdot (TEX - TCAT(k-1)) \cdot \Delta t \ldots (1)$$

$$m \cdot Cp \cdot TCAT(k) - m \cdot Cp \cdot TCAT(k-1)$$
$$= A \cdot h \cdot TEX \cdot \Delta t - A \cdot h \cdot TCAT(k-1) \cdot \Delta t \ldots (2)$$

$$m \cdot Cp \cdot TCAT(k)$$
$$= A \cdot h \cdot TEX \cdot \Delta t + (m \cdot Cp - A \cdot h \cdot \Delta t) \cdot TCAT(k-1) \ldots (3)$$

$$TCAT(k) = \frac{1}{m \cdot Cp} [A \cdot h \cdot TEX \cdot \Delta t + (m \cdot Cp - A \cdot h \cdot \Delta t) \cdot TCAT(k-1)] \ldots (4)$$

$$\begin{cases} \text{MASS } m \quad [kg] \\ \text{HEAT TRANSFER COEFFICIENT } h \quad [kcal/m^2 \cdot \degree C \cdot hr] \\ \text{SECTIONAL AREA } A \quad [m^2] \\ \text{SPECIFIC HEAT } Cp \quad [kcal/\degree C \cdot kg] \end{cases}$$

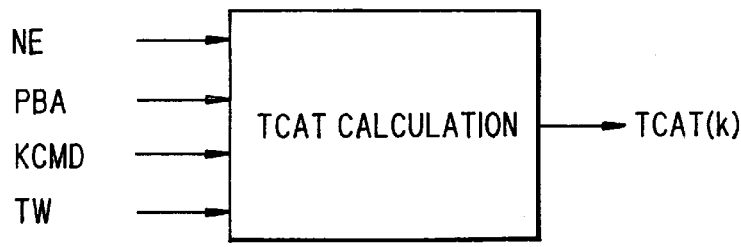

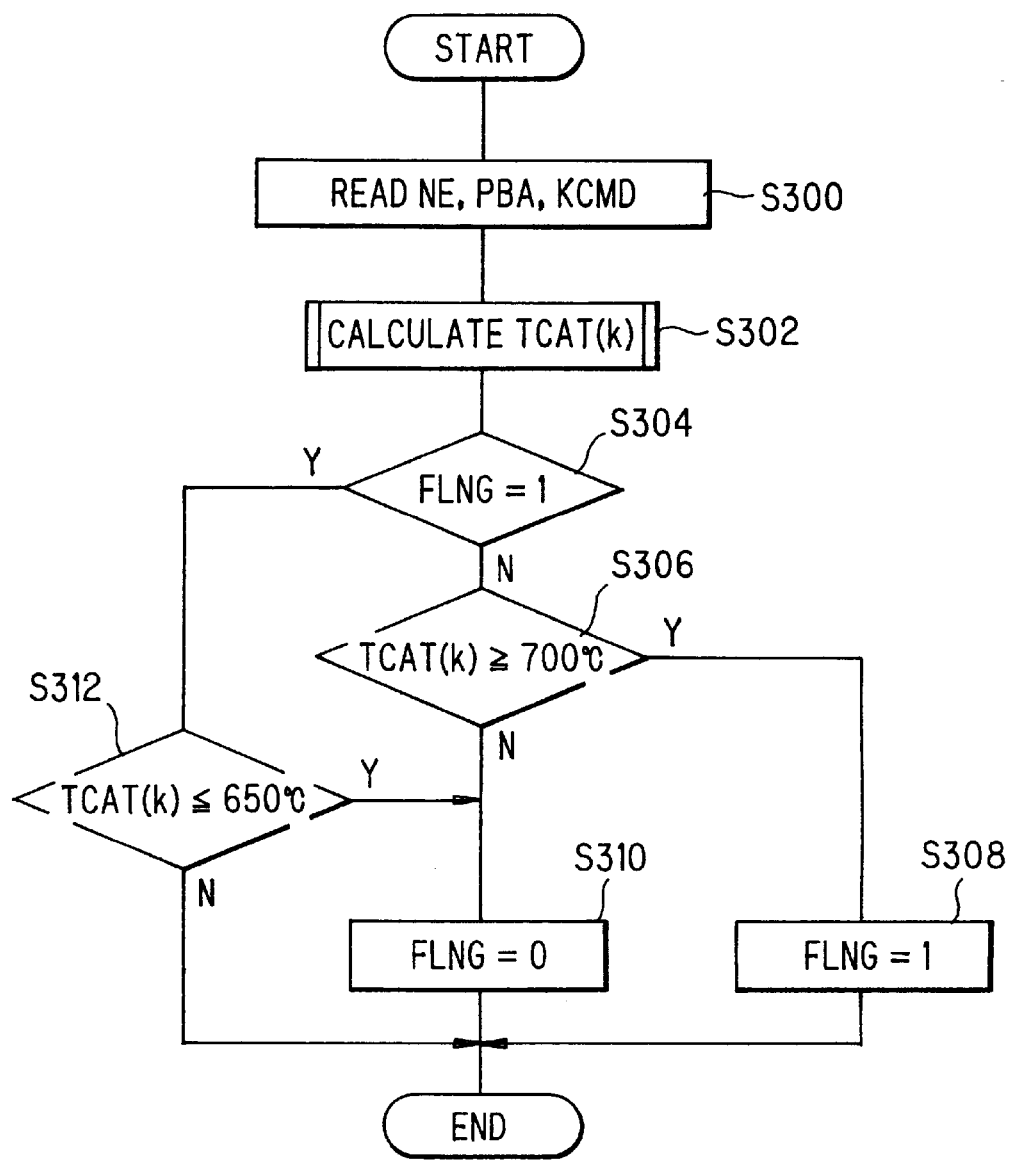

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine, particularly to an internal combustion engine exhaust gas purification system that uses a selective-reduction type NOx reduction catalyst to reduce NOx (oxides of nitrogen) in an oxidizing state in the exhaust gas by use of HCs (hydrocarbons) as a reducing agent.

2. Description of the Prior Art

One of the known selective-reduction type NOx (oxides of nitrogen) reduction catalysts that decompose NOx in an oxidizing atmosphere in the exhaust gas is the catalyst taught by, for example, U.S. Pat. No. 5,326,735 and No. 5,487,268, which comprise iridium and an alkaline earth metal carried together on a substrate (monolith) composed of at least one material (substance) selected from among metallic carbides and metallic nitrides. Another is the catalyst taught by U.S. Pat. No. 5,402,641, which is an NOx-absorbent comprising of platinum (Pt) or like precious metal borne on a substrate (monolith) and referred as an absorbent catalyst.

Regarding the first-mentioned catalyst, U.S. Pat. No. 5,357,749, for example, teaches a system for purifying exhaust gas by using this type of catalyst and regulating the NOx constituent concentration and HC constituent concentration in the exhaust gas to a prescribed ratio.

Regarding the latter-mentioned catalyst, U.S. Pat. No. 5,402,641 teaches a system provided with a catalyst comprised of an NOx absorbent such as an alkaline earth metal oxide. When the air/fuel ratio is lean and the temperature of the exhaust gas (or the catalyst) is high, the system intermittently or continuously controls the air/fuel ratio to the stoichiometric air/fuel ratio so as to suppress SOx contamination of the NOx absorbent decomposition catalyst and enable regeneration thereof when contamination occurs.

Recently, however, the move toward leaner air/-fuel ratios, as seen in lean-burn engines and direct injection engines (in which fuel is directly injected in the engine cylinder), has created a need for higher NOx constituent purification performance in an oxidizing environment.

SUMMARY OF THE INVENTION

An object of this invention is therefore to provide an exhaust gas purification system of an internal combustion engine of the aforesaid type utilizing a selective-reduction type NOx (nitrogen oxide) reduction catalyst, particularly a selective-reduction type nitrogen oxide reduction catalyst composed of a heat resistant inorganic oxide substrate (monolith) and iridium borne on the substrate (monolith) as the active material (substance), that offers enhanced NOx constituent purification performance in an oxidizing environment in the exhaust gas.

To achieve this object, the invention provide a system for purifying exhaust gas of an internal combustion engine having a catalyst in an exhaust system of the engine, said catalyst being a selective-reduction type nitrogen oxide reduction catalyst composed of a heat resistant inorganic oxide carrier and iridium borne on the carrier as an active species and reducing nitrogen oxide when exhaust gas generated by the engine is in an oxidizing state. In the system, engine operating condition detecting means is provided for detecting parameters, including at least an engine speed and an engine load, indicative of operating conditions of the engine, catalyst temperature determining means is provided for determining a temperature of the catalyst; and air/fuel ratio controlling means is provided for controlling an air/fuel ratio to be supplied to the engine in response to at least one of the detected parameters and the determined temperature of the catalyst.

This and other objects and advantages of the invention will be more apparent from the following description and drawings, in which:

FIG. 8 is a diagram for explaining the catalyst temperature calculation or estimation procedure of the flow chart of FIG. 7;

FIG. 9 is a flow chart, similar to FIG. 4, but illustrating the operation of the system according to a second embodiment the invention;

DETAILED DESCRIPTION OF THE PREFERRED EMBODIMENTS

Embodiments of the exhaust gas purification system of an internal combustion engine according to the invention will now be explained with reference to the attached drawings.

Figure 1:
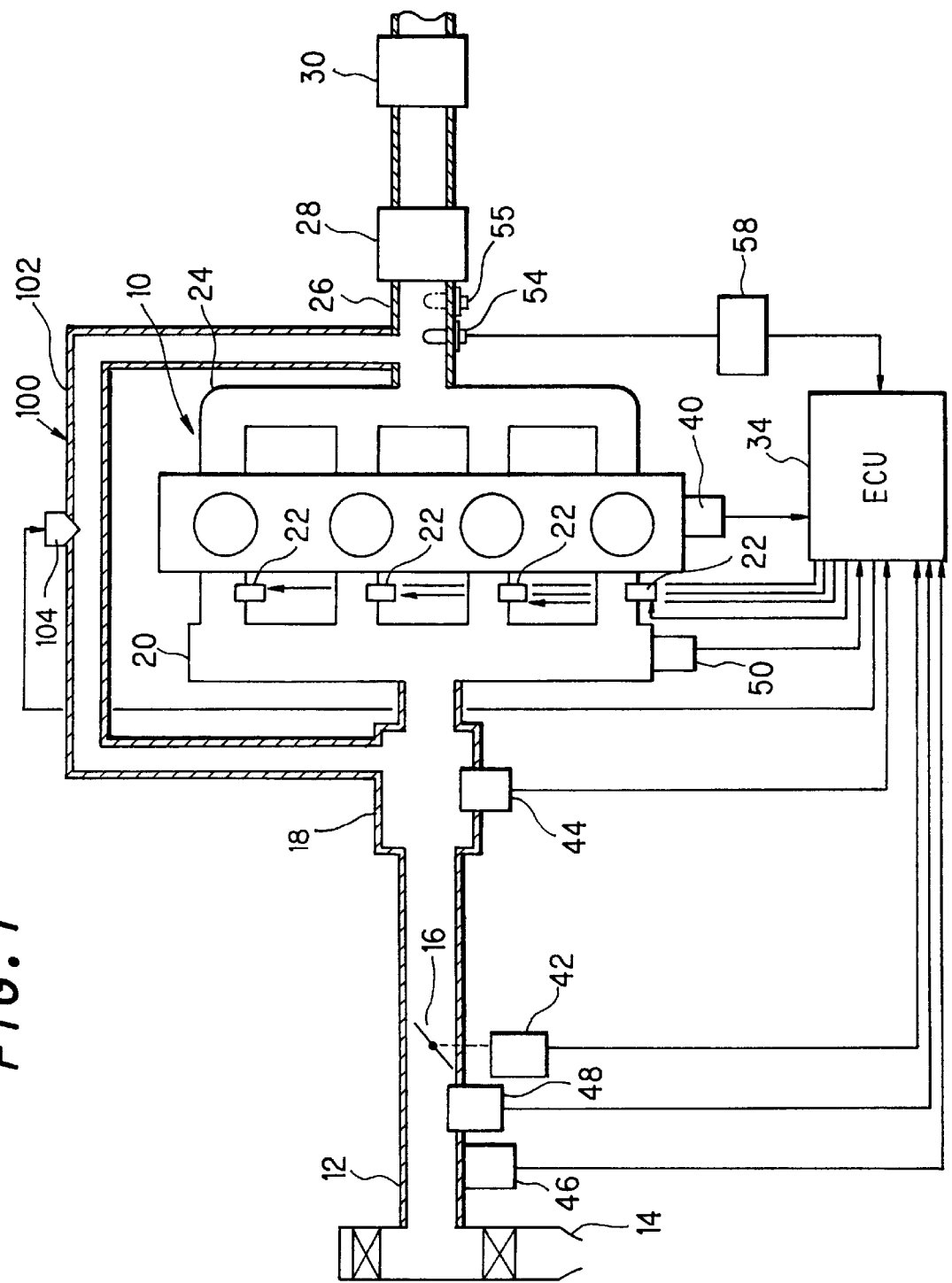
FIG. 1 is a schematic overview of the exhaust gas purification system of an internal combustion engine according to the invention.

FIG. 1 is a schematic overview of the system.

Reference numeral 10 in this figure designates an OHC in-line four-cylinder internal combustion engine. Air drawn into an air intake pipe 12 through an air cleaner 14 mounted on its far end is supplied to the first to fourth cylinders through a surge tank 18, an intake manifold 20 and intake valves (not shown), while the flow thereof is adjusted by a throttle valve 16.

A fuel injector 22 for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown).

The exhaust gas produced by the combustion is discharged through an exhaust valve (not shown) into an exhaust manifold 24, from where it passes through an exhaust pipe 26 to a first catalytic converter 28 and a second catalytic converter (three-way catalytic converter) 30 to be purified and then discharged to the atmosphere.

The first catalytic converter 28 uses the catalyst that reduces nitrogen oxides in an oxidizing environment referred to earlier, namely, a selective-reduction type nitrogen oxide reduction catalyst (NOx decomposition catalyst) composed of a heat resistant inorganic oxide substrate (monolith) and iridium borne on the substrate (monolith) as the active species. The heat resistant oxide substrate (monolith) is a ceramic material, which may, for example, be at least one material (substance) selected from a group comprised of metallic carbides and metallic nitrides. The second catalytic converter 30 uses a conventional three-way catalyst.

The engine 10 is equipped with an EGR mechanism (exhaust gas recirculation mechanism) 100 which recirculates exhaust gas to the intake system.

Figure 2:
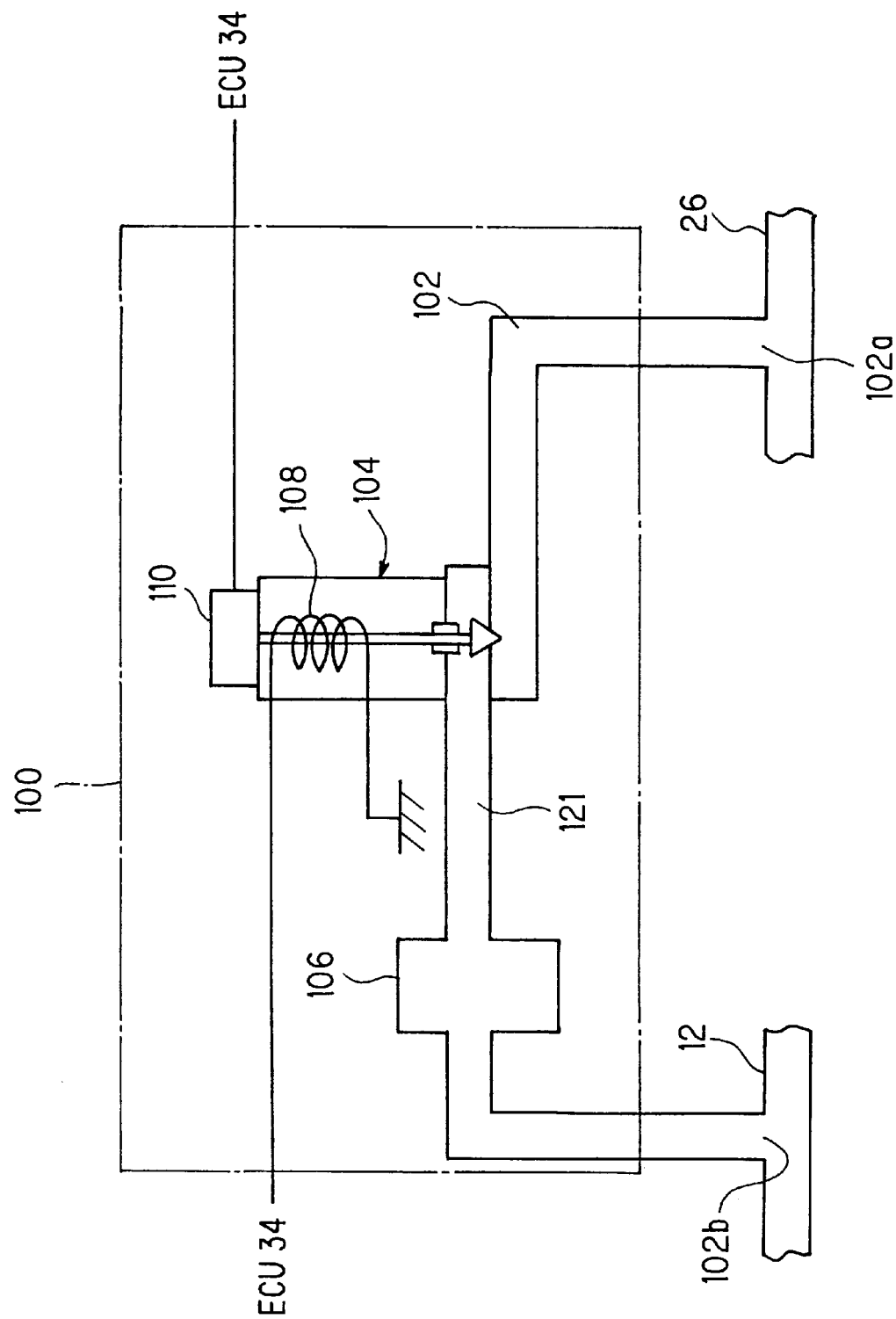
FIG. 2 is a diagram for explaining the EGR mechanism shown in FIG. 1 in detail.

As shown in FIG. 2, the EGR mechanism 100 has an EGR passage 102 whose one end 102a is connected with the exhaust pipe 26 on the upstream side of the first catalytic converter 28 (not shown in FIG. 2) and whose other end 102b is connected to the air intake pipe 12 on the downstream side of the throttle valve 16 (not shown in FIG. 2). For regulating the amount of recirculated exhaust gas, an EGR valve 104 for regulating the amount of EGR and a volume chamber 106 are provided at an intermediate portion of the EGR passage 102.

The EGR valve 104 is an electromagnetic valve having a solenoid 108 which is connected to an electronic control unit (ECU) 34 (described later). The degree of opening of the EGR valve 104 is linearly varied by an output command from the ECU 34. The EGR valve 104 is provided with a lift sensor 110 which detects the degree of opening of the EGR valve 104 and sends a corresponding signal to the ECU 34.

As shown in FIG. 1, the engine 10 is provided in its ignition distributor (not shown) with a crank angle sensor 40 for developing a cylinder discrimination signal at a prescribed crank angle of a prescribed cylinder and generating TDC (Top Dead Center) signals at prescribed crank angles, e.g., at the TDC of every cylinder, and CRK signals at subdivisions thereof, e.g., once every 15 degrees.

A throttle position sensor 42 associated with the throttle valve 16 generates a signal corresponding to the degree of opening of the throttle valve 16. A manifold absolute pressure sensor 44 provided in the air intake pipe 12 downstream of the throttle valve 16 generates a signal corresponding to the manifold absolute pressure PBA in the intake pipe.

An atmospheric pressure sensor 46 provided at an appropriate location on the engine 10 generates a signal corresponding to the atmospheric pressure PA. An intake air temperature sensor 48 provided upstream of the throttle valve 16 generates a signal corresponding to the temperature of the intake air. A coolant temperature sensor 50 provided at an appropriate location on the engine outputs a signal corresponding to the engine coolant temperature TW.

Further, an air/fuel ratio sensor 54 provided in the exhaust system at a confluence point downstream of the exhaust manifold 24 and upstream of the first catalytic converter 28 outputs a signal proportional to the oxygen concentration of the exhaust gas.

Figure 3:
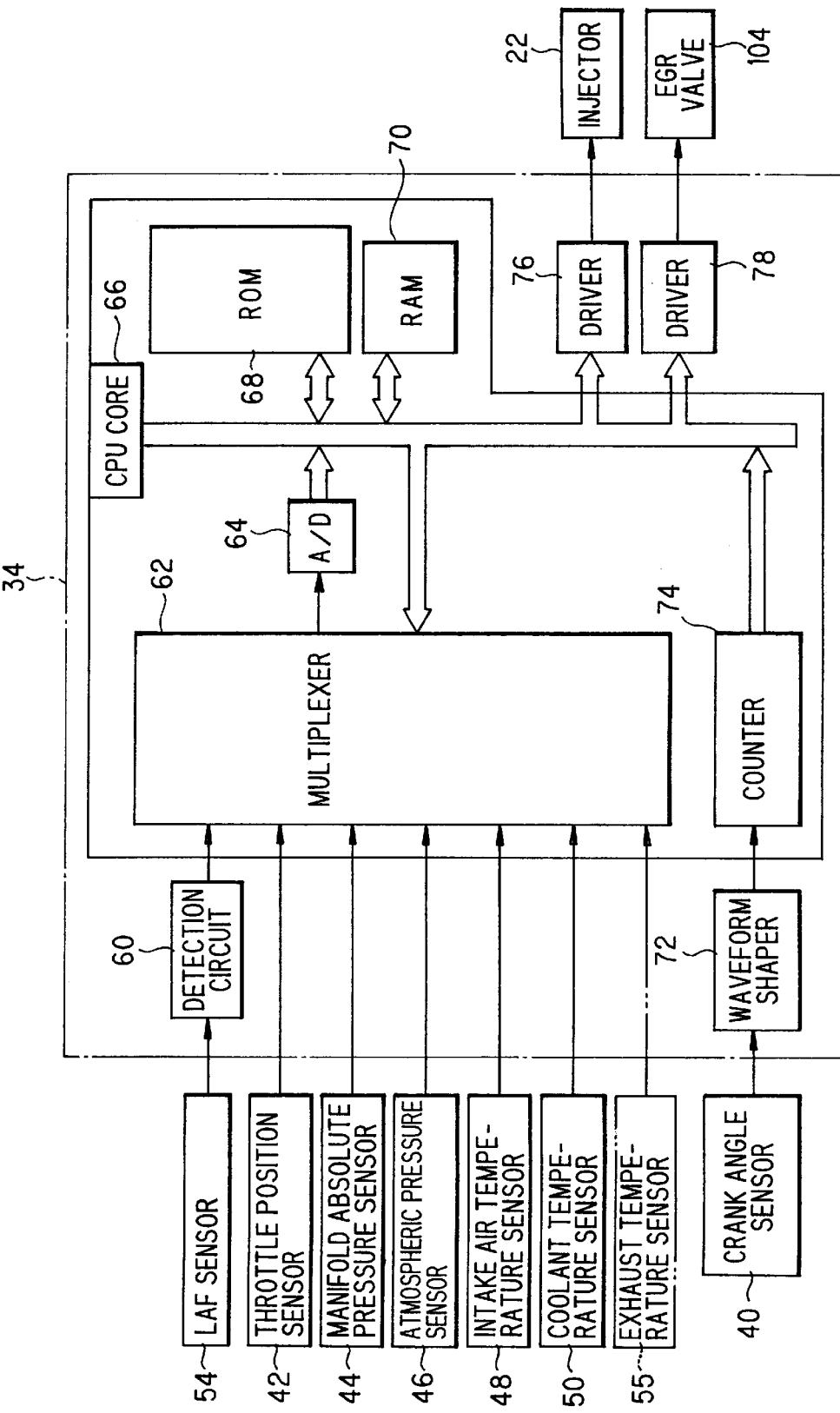
FIG. 3 is a detailed block diagram of the control unit shown in FIG. 1.

Details of the ECU 34 are shown in the block diagram of FIG. 3. The output of the air/fuel ratio sensor (shown as an LAF sensor) 54 is received by a detection circuit 60, where it is subjected to appropriate linearization processing for producing a signal proportional to the oxygen concentration of the exhaust gas.

The output of the detection circuit 60 is forwarded through a multiplexer 62 and an A/D converter 64 to a CPU (central processing unit). The CPU has a CPU core 66, a ROM (read-only memory) 68 and a RAM (random access memory) 70. Similarly, the analog outputs of the throttle opening sensor 42 etc. are input to the CPU through the multiplexer 62 and the A/D converter 64 and stored in the RAM 70.

The output of the crank angle sensor 40 is shaped by a waveform shaper 72 and the CRK signal is counted by a counter 74. The count value is input to the CPU as the engine speed NE. In the CPU, the CPU core 66 executes commands stored in the ROM 68 to compute manipulated variables in the manner described later and drives the fuel injectors 22 of the respective cylinders via a drive circuit 76 and the EGR valve 104 through a drive circuit 78. (The lift sensor 110 is not shown in FIG. 3.)

The operation of the system will now be explained.

Figure 4:
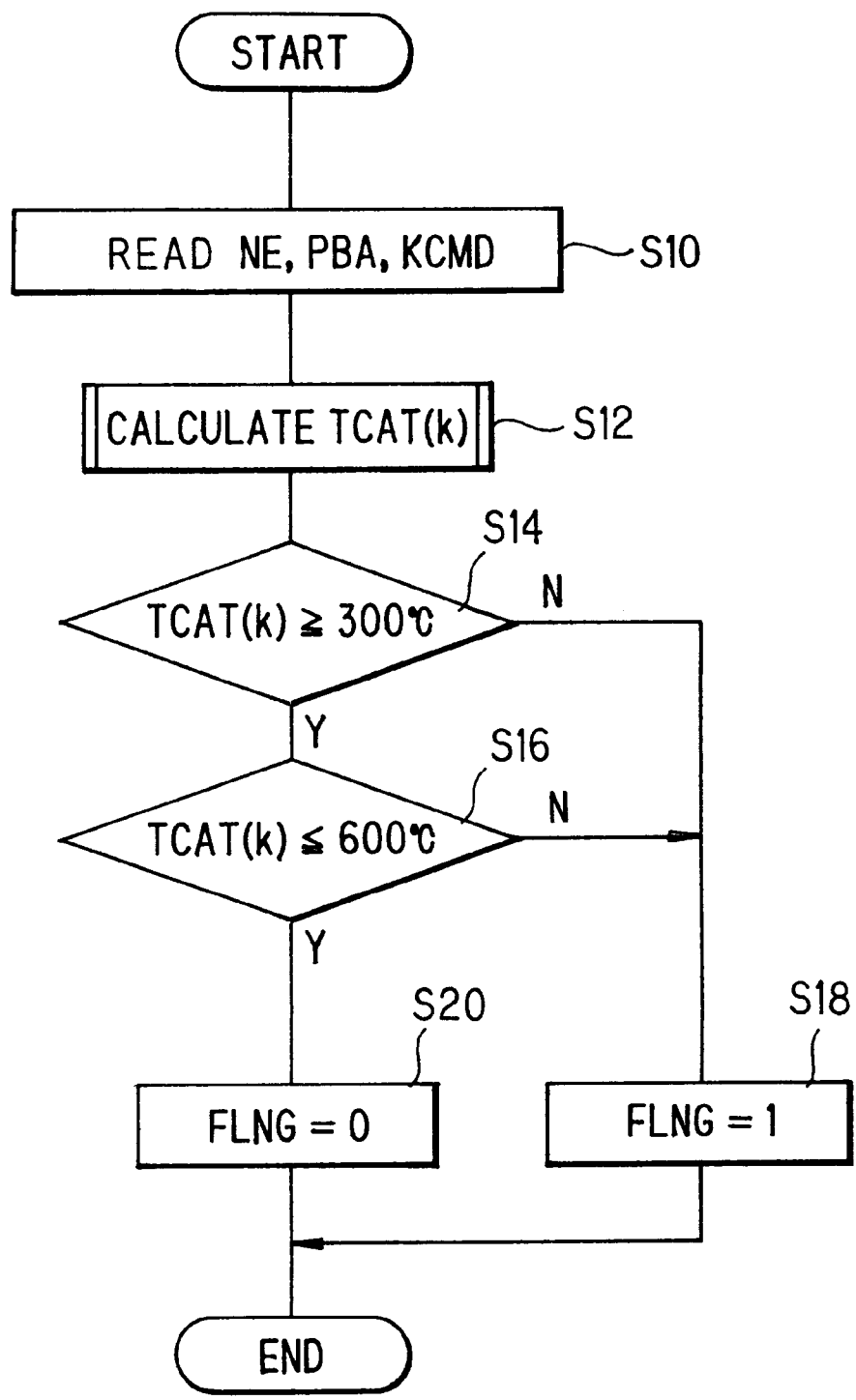
FIG. 4 is a flow chart illustrating the operation of the exhaust gas purification system of an internal combustion engine according to the invention.

FIG. 4 is a flow chart showing the operation of the system.

Before going into an explanation of this figure, however, the exhaust gas purification technique of the invention will be explained.

As mentioned earlier, the first catalytic converter 28 of this system uses a selective-reduction type NOx catalyst that reduces NOx constituents in an oxidizing environment, more specifically, a selective-reduction type NOx catalyst requiring HC constituents to decompose NOx constituents, and is composed of a heat resistant inorganic oxide substrate (monolith) and iridium borne on the substrate (monolith) as the active material (substance).

Through experiments conducted regarding selective-reduction type nitrogen oxide catalysts of this type, the inventors learned that the NOx purification rate is best when the catalyst temperature TCAT is within a prescribed range, e.g., between 300° C. and 600° C. This can be seen from the NOx purification rate vs catalyst temperature characteristic curve in FIG. 5. The exhaust gas purification system of this invention is based on this knowledge.

With the foregoing as background, the operation of the system will now be explained with reference to the flow chart of FIG. 4. The routine of this flow chart is activated at prescribed intervals of, for example, 200 msec.

The program starts at S10 in which the detected engine speed NE, manifold absolute pressure PBA and other detected operating parameters indicative of the operating condition are read. The desired air/fuel ratio KCMD, calculated as explained later, is also read.

The program next proceeds to S12 in which the catalyst temperature TCAT(k) of the first catalytic converter 28 is calculated or estimated. The method for indirectly ascertaining this temperature is also explained later. The notation (k) indicates a sample number in the discrete system, precisely, (k) the value at current cycle and (k–1) the value in the preceding circle. More precisely, (k) is the value when the FIG. 4 program is executed at the current time and (k–1) the value when it was executed in the last time.

The program then proceeds to S14 in which it is checked whether the calculated catalyst temperature TCAT(k) is 300° C. or higher. When the result is negative, the temperature is not in the prescribed range specified in FIG. 5 and the program goes to S18 in which the bit of a flag FLNG is set to 1. The flag FLNG is for indicating air/fuel ratio lean control enable/disable. Setting the flag bit to 1 means that lean control of the air/fuel ratio is disabled.

When the result in S14 is affirmative, the program proceeds to S16 in which a check is made as to whether the calculated catalyst temperature TCAT(k) is 600° C. or lower. When the result is negative, the temperature is not in the prescribed range specified in FIG. 5 and the program goes to S18 in which the bit of the flag FLNG is set to 1. When the result is affirmative, on the other hand, the program proceeds to S20 in which the bit of the flag is set to 0 indicating that lean control of the air/fuel ratio is enabled.

The calculation of the desired air/fuel ratio KCMD will now be explained.

Figure 6:
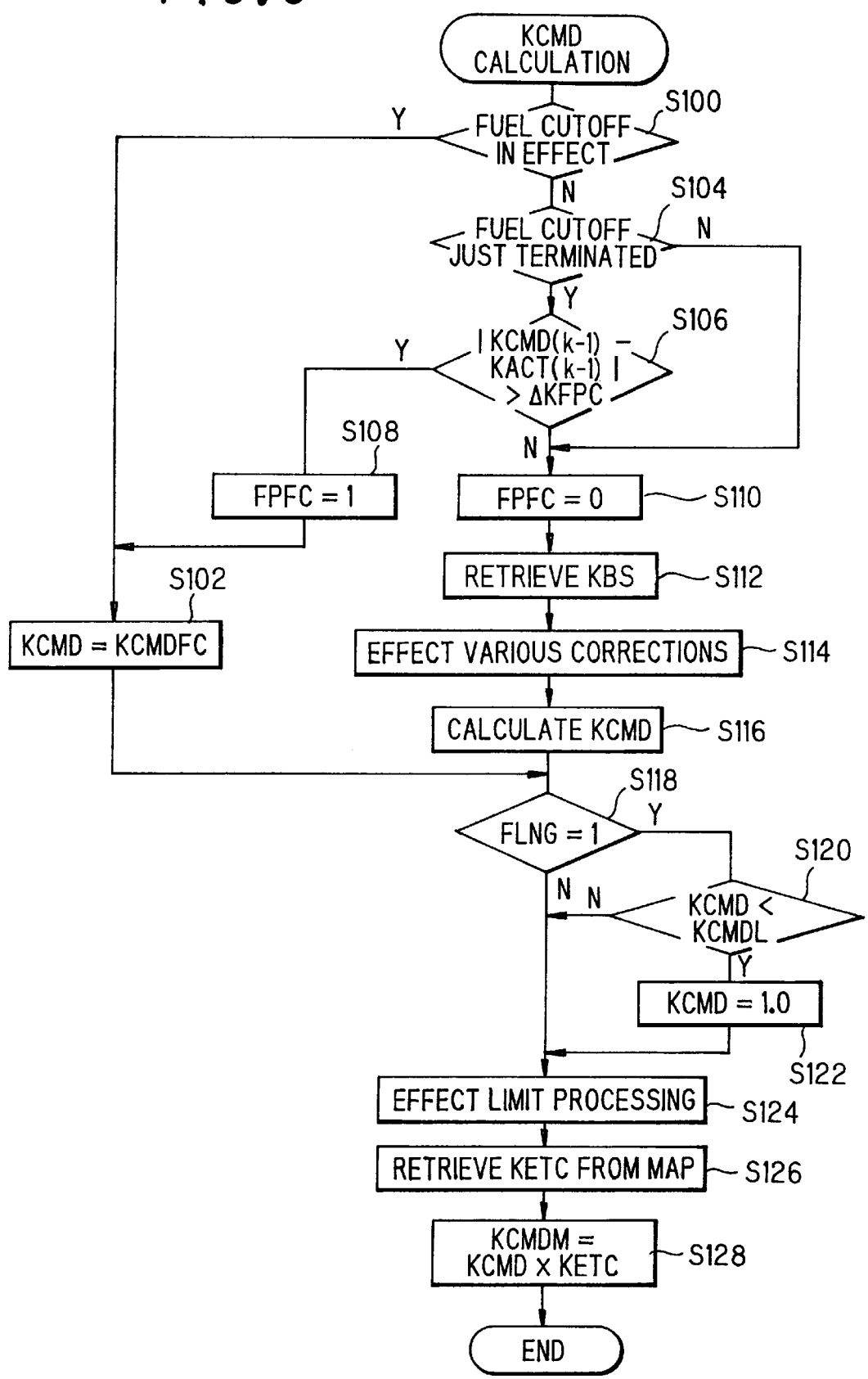
FIG. 6 is a subroutine flow chart showing the procedure for calculating a desired air/fuel ratio KCMD referred to in the flow chart of FIG. 4.

The procedure for this is shown in the flow chart of FIG. 6. This routine is executed every TDC (Top Dead Center).

First, in S100 of this flow chart, it is checked whether fuel cutoff is in effect. When the result is affirmative, the desired air/fuel ratio KCMD is set to prescribed value KCMDFC (e.g., 1.0) in S102.

When the result in S100 is negative, it is checked in S104 whether fuel cutoff was just terminated (e.g., whether 500 msec or less have passed since fuel cutoff termination). When the result is affirmative, it is checked in S106 whether the absolute value of the error or deviation between the value KCMD(k-1) of the desired air/fuel ratio in the preceding cycle and the value KACT(k-1) of the detected air/fuel ratio (LAF sensor output) in the preceding cycle exceeds a prescribed value KFPC (e.g., 0.14).

When the result in S106 is affirmative, the bit of a flag FPFC indicating that fuel cutoff was just terminated is set to 1 in S108, whereafter S102 is executed. When the result in S106 is negative and when the result in S104 is negative, the flag bit is reset to 0 in S10.

Next, in S112, the detected engine speed NE and manifold absolute pressure PBA are used as address data to retrieve a base value KBS of the desired air/fuel ratio from a prescribed mapped data. Then, in S114, the retrieved base value is corrected for the coolant temperature, engine load and the like in accordance with the engine operating condition.

Next, in S116, the corrected base value is multiplied by a lean correction coefficient, a deceleration correction coefficient and the like for further correction, thereby calculating the desired air/fuel ratio KCMD of the current cycle (the current cycle suffix k is omitted for simpler notation). (More explicitly, the desired air/fuel ratio KCMD and the desired air/fuel ratio correction coefficient KCMDM calculated based thereon as described later are expressed as equivalent ratios.) Next, in S 118, it is checked whether the bit of the flag FLNG is set to 1. When the result is affirmative, it is checked in S120 whether the calculated desired air/fuel ratio KCMD is smaller than a prescribed value KCMDL (a lean control value, e.g., 0.8 expressed as equivalent ratio). When the result is affirmative, the desired air/fuel ratio KCMD is fixed at 1.0 (stoichiometric air/fuel ratio) in S122. In other words, the value of the desired air/fuel ratio KCMD is modified to the stoichiometric air/fuel ratio because lean control of the air/fuel ratio is disabled. When the result in S118 or S120 is negative, S122 or S120 and S122 are skipped because such processing is unneeded.

Next, in S124, the desired air/fuel ratio KCMD is subjected to appropriate limit processing, whereafter, in S126, the calculated desired air/fuel ratio KCMD is used as an address datum to retrieve a charging efficiency correction coefficient KETC from a prescribed table data. Then, in S128, the desired air/fuel ratio KCMD is multiplied by the retrieved charging efficiency correction coefficient KETC to calculate a desired air/fuel ratio correction coefficient KCMDM.

The calculation of the catalyst temperature TCAT referred to in connection with S12 will now be explained.

Figure 7:
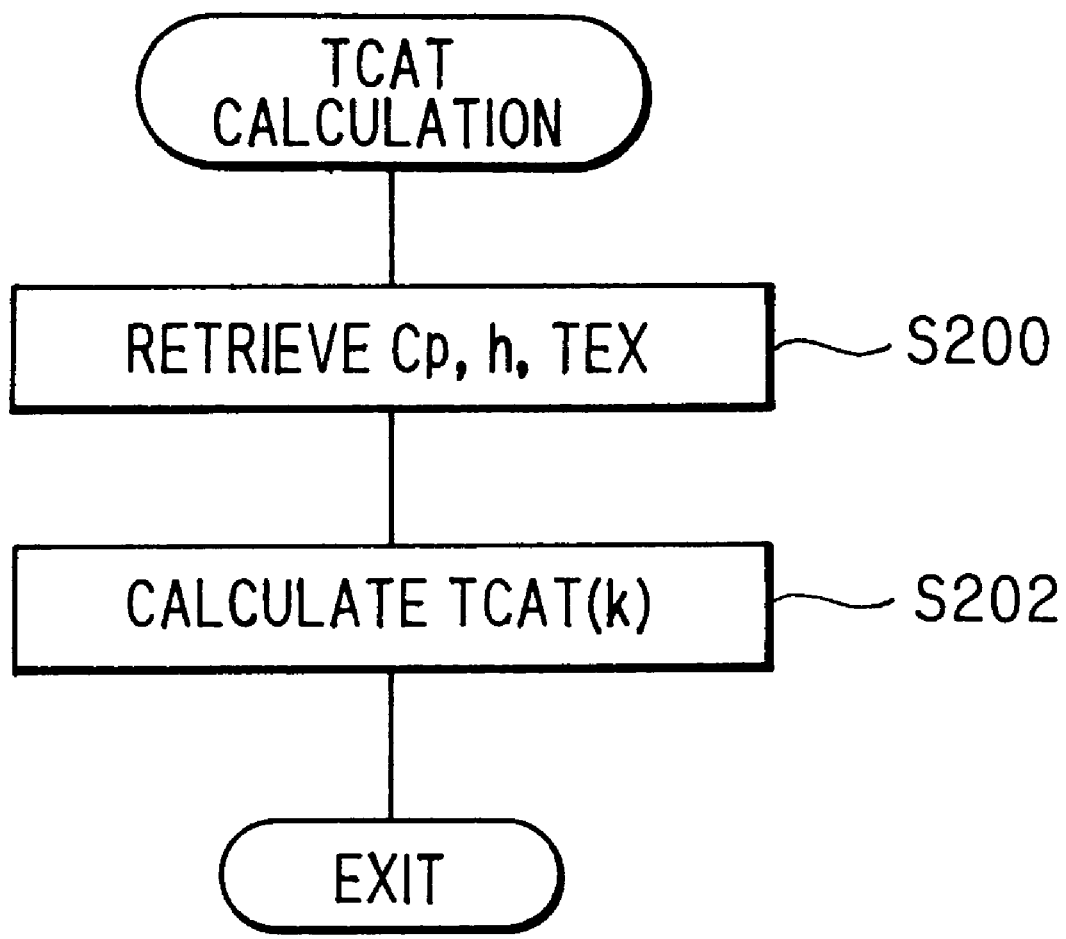
FIG. 7 is a subroutine flow chart showing the procedure for calculating or estimating the catalyst temperature referred to in the flow chart of FIG. 4.

The procedure for this is shown in the flow chart of FIG. 7. This routine is activated once every prescribed time interval t (i.e., once every 200 msec, the interval between consecutive activations of the routine of FIG. 4).

First, in S200, the specific heat Cp (kca/° C.·kg), the heat transfer coefficient h (kcal/m$^2$·° C. time) and the exhaust gas temperature TEX (° C.) are retrieved from map or table data based on the engine operating conditions, specifically, the engine speed NE, load (manifold absolute pressure PBA) and desired air/fuel ratio KCMD. The mass (kg) and sectional area (m$^2$) of the catalytic converter 28 stored in memory beforehand are simultaneously read.

The catalyst temperature TCAT(k) is then calculated or estimated in S202. The exhaust gas temperature TEX must be corrected for the desired air/fuel ratio KCMD because the energy produced by the engine varies with the air/fuel ratio. In making this correction, the detected air/fuel ratio output by the LAF sensor 54 can be substituted for the desired air/fuel ratio KCMD.

The method of calculation or estimation will be explained with reference to FIG. 8.

The temperature change of the catalytic converter 28 is estimated from the heat transfer thereof determined by use of a thermodynamic formula to approximate the temperature change. More specifically, as shown at the top of the drawing, the heat quantity of the catalytic converter 28, defined as QCAT, is estimated from the input exhaust temperature TEX, and the mass m (kg), the specific heat Cp and the catalyst temperature TCAT of the catalytic converter 28.

The heat quantity input to the catalytic converter 28 during t sec (interval between consecutive activations of the illustrated routine) is defined as QCAT. As shown by Equation 1 in FIG. 8, QCAT can be approximated by subtracting the value TCAT(k-1) of the catalyst temperature in the preceding cycle from the value TCAT(k) of the catalyst temperature in the current cycle and multiplying the difference by the product of the mass m and specific heat Cp of the catalytic converter 28.

This is equivalent to subtracting the value TCAT(k-1) of the catalyst temperature in the preceding cycle from the input exhaust temperature TEX and multiplying the difference by the product of the sectional area A (m$^2$) and heat transfer coefficient h of the catalytic converter 28.

Rewriting the right side of Equation 1 gives Equation (2) and Equation (3). Equation (4) is then obtained from Equation (3) and used to calculate the catalyst temperature in the current cycle TCAT(k). Although Equation (4) is a recurrence formula requiring the initial value TCAT(k-1) of the catalyst temperature in the preceding cycle, this can be appropriately set based on the engine coolant temperature or the like.

Obtaining the catalyst temperature by computation and estimation in this way eliminates the need for a temperature sensor and simplifies the system configuration. Moreover, the determination of the catalyst temperature by heat balance calculation avoids the detection lag encountered with a sensor.

In the embodiment of the system configured in the foregoing manner, when the desired air/fuel ratio KCMD is set to a value in the lean direction in SI 14 and S116 of the flow chart of FIG. 6, then, if the catalyst temperature TCAT(k) is found to be in the prescribed range in S14 and S16 of the flow chart of FIG. 4, lean control of the air/fuel ratio is enabled in S20 of the same flow chart. The result in S18 of FIG. 6 therefore becomes negative and lean control of the air/fuel ratio is implemented to enhance the NOx purification rate of the catalytic converter 28.

Figure 5:
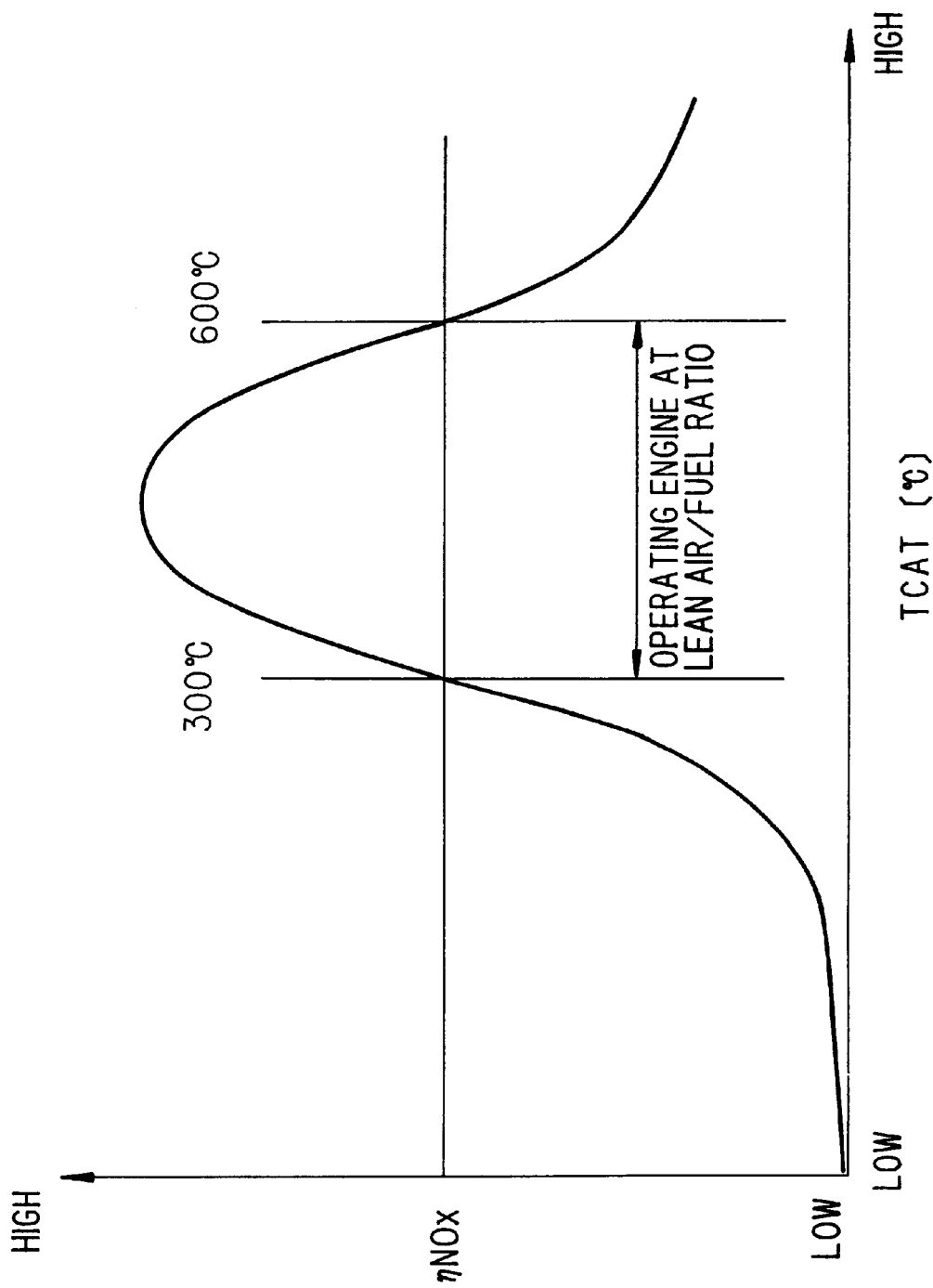
FIG. 5 is a graph for explaining the exhaust gas purification technique shown in FIG. 4, indicating the temperature characteristic curve of the selective-reduction type nitrogen oxide reduction catalyst shown in FIG. 1.

The catalytic converter 28 having iridium as its active material (substance) and exhibiting the temperature characteristic shown in FIG. 5 can therefore effect NOx purification within the optimum temperature range to ensure enhanced NOx constituent purification performance in an oxidizing environment.

Moreover, since the catalyst temperature is determined by computation and estimation without use of a temperature sensor, the system has a simple configuration and does not experience the detection lag encountered when a temperature sensor is employed.

FIG. 9 is a flow chart illustrating the operation of a system according to a second embodiment of the invention.

The program begins in S300 in which the engine speed NE, manifold absolute pressure PBA and other operating parameters, and the desired air/fuel ratio KCMD are read, and proceeds to S302 in which the catalyst temperature TCAT(k) is calculated or estimated. As in the first embodiment, this calculation is made in accordance with the flow chart of FIG. 7.

The program next proceeds to S304 in which it is checked whether the bit of the flag FLNG is set to 1, i.e., whether lean control of the air/fuel ratio is disabled. Since the initial value of the flag bit is 0, the result in S304 is normally negative and the program goes to S306 in which it is checked whether the calculated catalyst temperature in the current cycle TCAT(k) is 700° C. or higher.

When the result in S306 is affirmative, the bit of the flag is set to 1 in S308 to disable lean control of the air/fuel ratio. In other words, lean air/fuel ratio control is disabled when the temperature of the catalyst is not less than this reference temperature. When the result in S306 is negative, the bit of the flag is reset to 0 in step S310 to enable lean control of the air/fuel ratio.

When the result in S304 is affirmative, the program proceeds to S312 in which it is checked whether the calculated value TCAT(k) of the catalyst temperature in the current cycle is 650° C. or lower. When the result in S312 is negative, the routine is immediately terminated. When it is affirmative, the program proceeds to S310 in which the bit of the flag is reset to zero to enable lean control of the air/fuel ratio. Thus, even after the catalyst temperature falls below 700° C., lean control of the air/fuel ratio is maintained until it falls to or below 650° C. This is to avoid control hunting.

The reason for conducting the foregoing control will be explained with reference to FIGS. 10 and 11.

Figure 10:
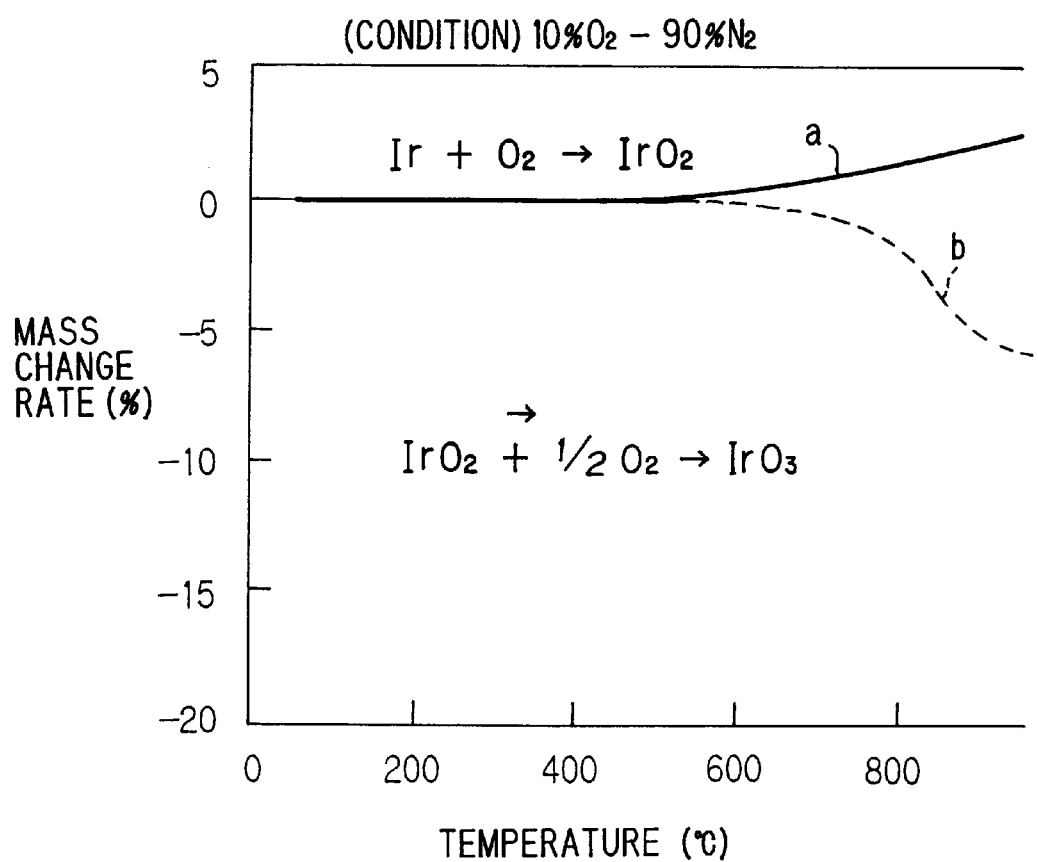
FIG. 10 is a chart representing experimental data underlying the engine exhaust gas purification technique of the system according to the second embodiment of the invention.
Figure 11:
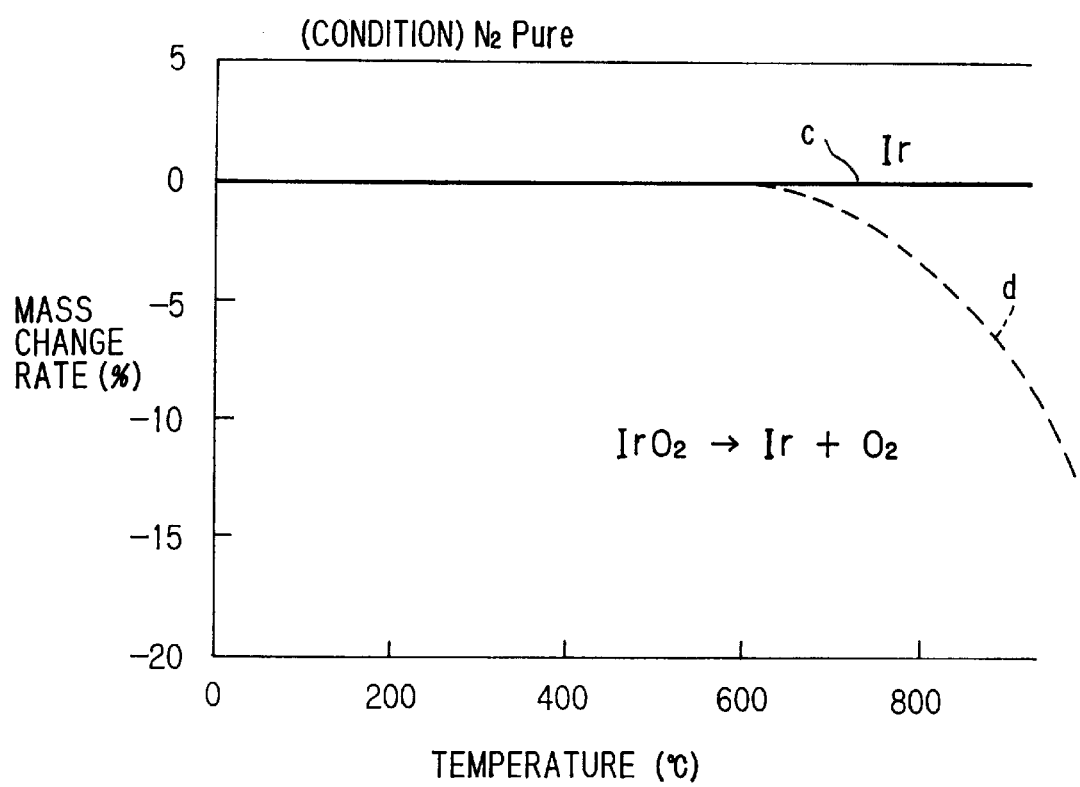
FIG. 11 is another chart representing experimental data underlying the engine exhaust gas purification technique of the system according to the second embodiment of the invention.

FIGS. 10 and 11 are charts based on data obtained by the inventors in experiments using model gases and iridium powder. Iridium (Ir) was placed in an atmosphere of nitrogen gas ($N_2$) containing 10% oxygen ($O_2$) as a simulated lean air/fuel ratio exhaust gas. The change in mass of iridium compound (defined as including iridium and iridium dioxide ($IrO_2$); hereinafter the same) with change in temperature was observed.

The result is indicated by the solid curve a in FIG. 10. The increase in the mass of iridium compound seen to start from around 500° C. was caused by partial oxidization of the iridium into iridium dioxide. The experiment was repeated under the same conditions except for replacing iridium with iridium dioxide ($IrO_2$). The result is indicated by the broken-line curve b in FIG. 10.

The decrease in the mass of iridium compound seen to start from around 600° C. was caused by vaporization of iridium trioxide ($IrO_3$) produced by further oxidization of the iridium dioxide, i.e., by a volatilization phenomenon.

Iridium (Ir) was placed in a nitrogen gas ($N_2$) atmosphere as a simulated stoichiometric or rich air/fuel ratio exhaust gas. The change in mass of iridium compound with change in temperature was observed. The result is indicated by the solid curve c in FIG. 11. Substantially no change in iridium compound mass occurred. Owing to the absence of oxygen, the iridium did not oxidize even at temperatures exceeding 800° C.

The experiment was repeated under the same conditions except for replacing iridium with iridium dioxide ($IrO_2$). The result is indicated by the broken-line curve d in FIG. 11. The iridium compound mass started to decrease from around 650° C. and then dropped sharply from around 700° C. This is because the iridium dioxide was partially reduced into iridium.

Prompted by the experimental results shown FIGS. 10 and 11, the inventors conducted a series of field experiments on an engine using the aforesaid selective-reduction type nitrogen oxide catalyst composed of a heat resistant inorganic oxide substrate (monolith) and iridium borne on the substrate (monolith) as the active material (substance) (the catalytic converter 28). Substantially the same phenomena were found to occur as in the case of the laboratory experiments using model gases.

While some differences in critical temperature were noted in the field experiments on the engine, they are thought to have arisen owing to differences in experimental conditions regarding the field system, catalyst, model gases, and iridium powder. In the field experiments, the exhaust gas contained not only oxygen and nitrogen but also such other constituents as carbon dioxide and hydrocarbons. In addition, the catalyst was not comprised entirely of iridium powder but also contained an alkaline metal and/or other auxiliary catalyst as well as a substrate.

These factors are assumed to have caused the differences between the critical temperatures in the laboratory and field experiments on the engine. Specifically, the critical temperatures in the field experiments were somewhat above (by 50 to 100° C.) those in the laboratory experiments using a model gas.

The inventors thus learned that when the selective-reduction type nitrogen oxide catalyst composed of a heat resistant inorganic oxide substrate (monolith) and iridium borne on the substrate (monolith) as the active material (substance) (the catalytic converter 28) is used and the air/fuel ratio is controlled so as to make excessive of oxygen ($O_2$) present, i.e., controlled in a lean direction, the iridium reacts with oxygen to form iridium dioxide at a catalyst temperature or an exhaust system temperature up to 600° C.

They additionally learned that when the catalyst temperature or the exhaust system temperature rises to or above 650° C. iridium dioxide further oxidizes into iridium trioxide and that the resulting loss of iridium, the active species, by volatilization markedly degrades catalyst performance.

On the other hand, the inventors also found that when oxygen is not present, particularly when excess oxygen is not present, still more particularly when the air/fuel ratio is near stoichiometric (or an even lower and richer value), iridium dioxide is reduced, i.e., decomposed into iridium and oxygen, when the catalyst temperature or the exhaust system temperature is at or above 700° C., whereby iridium, the active material (substance), is regenerated. They further learned that the rate of reduction to iridium is about ten fold the oxidization rate of iridium dioxide.

From these facts it will be understood that, in the first catalytic converter 28 (NOx catalyzer), even if iridium, the active species, is oxidized into iridium dioxide in an oxidizing environment of 500° C. or higher, the iridium dioxide can be quickly reduced to regenerate the catalyst of the catalytic converter 28 by preventing oxidation of the iridium dioxide to iridium trioxide and controlling the catalyst temperature and the air/fuel ratio to obtain a reducing environment of not lower than 650° C.

The second embodiment was accomplished based on this knowledge. As was explained with reference to the flow chart of FIG. 9, the air/fuel ratio is returned from a lean air/fuel ratio to a stoichiometric air/fuel ratio until the catalyst temperature or the exhaust gas temperature falls to 700° C. As was pointed out, iridium reduction proceeds ten times faster than iridium oxidization. Degradation of catalyst performance can therefore be prevented by reduction of iridium dioxide.

Although the first and second embodiments respectively provide the effects described in the foregoing when implemented independently, a still greater effect can be obtained by implementing them in combination.

Specifically, by conducting air/fuel ratio lean control to enhance the catalyst purification performance when the catalyst temperature is in the aforesaid prescribed range and conducting air/fuel ratio rich control when the catalyst temperature rises above the prescribed range, a high purification rate can be maintained over the long term while concurrently preventing degradation of catalyst performance. The purification performance of the catalyst can therefore be maximized.

The embodiments are configured to have a system for purifying exhaust gas of an internal combustion engine having a catalyst in an exhaust of the engine, said catalyst reducing NOx when exhaust gas generated by the engine is in an oxidizing state. In the system, engine operating condition detecting means is provided for detecting parameters, including at least an engine speed and an engine load, indicative of operating conditions of the engine; catalyst temperature determining means is provided for determining a temperature of the catalyst; and air/fuel ratio controlling means is provided for controlling an air/fuel ratio to be supplied to the engine in response to at least one of the detected parameters and the determined temperature of the catalyst, thereby enabling the catalyst to purify NOx in its optimum temperature characteristic range to achieve enhanced NOx constituent purification performance in an oxidizing environment. The catalyst is a selective-reduction type nitrogen oxide reduction catalyst which can be any selective-reduction type nitrogen oxide reduction catalyst composed of a ceramic or other heat resistant inorganic oxide substrate (monolith) and iridium borne on the substrate (monolith) as the active material (substance). The exhaust temperature can be substituted for the directly or indirectly detected temperature of the catalyst.

The system is configured such that said air/fuel ratio control means controls the air/fuel ratio to a value in a lean direction when the determined temperature of the catalyst is within a predetermined range. This enables the temperature dependence of the purification rate of the iridium-system NOx catalyst to be utilized to the maximum, thereby enhancing the NOx constituent purification performance in a said air/fuel ratio control means controls the air/fuel ratio to a value in a rich direction at or below a stoichiometric air/fuel ratio when the determined temperature of the catalyst is not less than a predetermined temperature. More specifically, the embodiment is configured to have a system for purifying exhaust gas of an internal combustion engine having a catalyst in an exhaust system of the engine, said catalyst being a selective-reduction type nitrogen oxide reduction catalyst composed of a heat resistant inorganic oxide substrate (monolith) and iridium borne on the substrate (monolith) as an active material (substance) and reducing nitrogen oxide when exhaust gas generated by the engine is in an oxidizing state, comprising engine operating condition detecting means for detecting parameters, including at least an engine speed and an engine load, indicative of operating conditions of the engine; catalyst temperature determining means for determining a temperature of the catalyst; discriminating means for discriminating whether an air/fuel ratio to be supplied to the engine is controlled to a value in a lean direction; catalyst temperature comparing means for comparing the temperature of the catalyst with a reference temperature; and lean air/fuel ratio inhibiting means for inhibiting the air/fuel ratio to be controlled in the lean direction when the temperature of the catalyst is not less than the reference temperature, thereby effectively preventing degradation of the iridium system NOx catalyst performance.

The system is further configured such that said catalyst temperature determining means determines the temperature of the catalyst by calculating the temperature based on at least one of the detected parameters and the air/fuel ratio. By this means the catalyst temperature can be accurately estimated to enhance NOx constituent purification performance and effectively prevent degradation of the NOx catalyst performance.

It should be noted in the foregoing that the second catalytic converter 30 can be an NOx decomposition catalytic converter with three-way catalytic capability or an oxidation catalytic converter that oxidizes hydrocarbons, carbon monoxide and the like. The only requirement of the second catalytic converter 30 is that it be suitable for use in an air/fuel ratio atmosphere other than a lean air/fuel ratio atmosphere. It suffices for the second catalytic converter 30 to be an NOx decomposition catalytic converter with three-way catalytic capability that can efficiently purify hydrocarbons and carbon monoxide.

It should also be noted that, while it was explained in the foregoing that the catalyst temperature can be determined by computation, it can instead be determined from the detection value of an exhaust gas temperature sensor installed in the exhaust system as indicated in phantom lines at reference numeral 55 in FIGS. 1 and 3. Alternatively, the catalyst temperature can be directly determined from the detection value of a temperature sensor like the exhaust gas temperature sensor 55 directly attached to the first catalytic converter 28.

It should moreover be noted that the catalyst temperature need not be indirectly detected as explained in the foregoing but can instead be directly detected by an additionally installed temperature sensor.

It should furthermore be noted that it is further possible use an $O_2$ sensor instead of the aforesaid air/fuel ratio sensor that produces an output proportional to the oxygen concentration of the exhaust gas.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for purifying exhaust gas of an internal combustion engine having a catalyst in an exhaust system of the engine, said catalyst being a selective-reduction type nitrogen oxide reduction catalyst composed of a heat resistant inorganic oxide carrier and iridium borne on the carrier as an active species and reducing nitrogen oxide when exhaust gas generated by the engine is in an oxidizing state, comprising:

engine operating condition detection means for detecting parameters, including at least an engine speed and an engine load, indicative of operating conditions of the engine;

catalyst temperature determining means for determining a temperature of the catalyst; and air/fuel ratio controlling means for controlling an air/fuel ratio, to be supplied to the engine in response to at least one of the detected parameters and the determined temperature of the catalyst, to a value in a lean direction when the determined temperature of the catalyst is within a predetermined range, and to a value in a rich direction, which is not more than a stoichiometric air/fuel ratio, when the determined temperature of the catalyst is outside of the predetermined range.

2. A system according to claim 1, wherein said air/fuel ratio control means controls the air/fuel ratio to a value in a rich direction not more than a stoichiometric air/fuel ratio when the determined temperature of the catalyst is not less than a predetermined temperature.

3. A system according to claim 1, wherein said catalyst temperature determining means determines the temperature of the catalyst by calculating the temperature based on at least one of the detected parameters and the air/fuel ratio.

4. A system according to claim 3, wherein said catalyst temperature determining means calculates the temperature of the catalyst based on at least a specific heat, a heat transfer coefficient and an exhaust temperature determined based on an engine speed, an engine load and the air/fuel ratio.

5. A system according to claim 1, wherein said catalyst temperature determining means determines the temperature of the catalyst by detecting the temperature through a sensor.

6. A system for purifying exhaust gas of an internal combustion engine having a catalyst in an exhaust system of the engine, said catalyst being a selective-reduction type nitrogen oxide reduction catalyst composed of a heat resistant inorganic oxide substrate (monolith) and iridium borne on the substrate (monolith) as an active material (substance) and reducing nitrogen oxide when exhaust gas generated by the engine is in an oxidizing state, comprising:

engine operating condition detecting means for detecting parameters, including at least an engine speed and an engine load, indicative of operating conditions of the engine;

catalyst temperature determining means for determining a temperature of the catalyst;

discriminating means for discriminating whether an air/fuel ratio to be supplied to the engine is controlled to a value in a lean direction;

catalyst temperature comparing means for comparing the temperature of the catalyst with a reference temperature; and lean air/fuel ratio inhibiting means for inhibiting the air/fuel ratio to be controlled in the lean direction when the temperature of the catalyst is not less than the reference temperature.

7. A system according to claim 6, wherein said catalyst temperature determining means determines the temperature of the catalyst by calculating the temperature based on at least one of the detected parameters and the air/fuel ratio.

8. A system according to claim 7, wherein said catalyst temperature determining means calculates the temperature of the catalyst based on at least a specific heat, a heat transfer coefficient and an exhaust temperature determined based on an engine speed, an engine load and the air/fuel ratio.

9. A system according to claim 6, wherein said catalyst temperature determining means determines the temperature of the catalyst by detecting the temperature through a sensor.

10. A method of purifying exhaust gas of an internal combustion engine having a catalyst in an exhaust system of the engine, said catalyst being a selective-reduction type nitrogen oxide reduction catalyst composed of a heat resistant inorganic oxide substrate (monolith) and iridium borne on the substrate (monolith) as an active material (substance) and reducing nitrogen oxide when exhaust gas generated by the engine is in an oxidizing state, comprising the steps of:

detecting parameters, including at least an engine speed and an engine load, indicative of operating conditions of the engine;

determining a temperature of the catalyst; and controlling an air/fuel ratio, to be supplied to the engine in response to at least one of the detected parameters and the determined temperature of the catalyst, to a value in a lean direction when the determined temperature of the catalyst is within a predetermined range, and to a value in a rich direction, which is not more than a stoichiometric air/fuel ratio, when the determined temperature of the catalyst is outside of the predetermined range.

11. A method according to claim 10, controlling the air/fuel ratio to a value in a rich direction not more than a stoichiometric air/fuel ratio when the determined temperature of the catalyst is not less than a predetermined temperature.

12. A method according to claim 10, determining the temperature of the catalyst by calculating the temperature based on at least one of the detected parameters and the air/fuel ratio.

13. A method according to claim 12, calculating the temperature of the catalyst based on at least a specific heat, a heat transfer coefficient and an exhaust temperature determined based on an engine speed, an engine load and the air/fuel ratio.

14. A method according to claim 10, determining the temperature of the catalyst by detecting the temperature through a sensor.

15. A method of purifying exhaust gas of an internal combustion engine having a catalyst in an exhaust system of the engine, said catalyst being a selective-reduction type nitrogen oxide reduction catalyst composed of a heat resistant inorganic oxide substrate (monolith) and iridium borne on the substrate (monolith) as an active species and reducing nitrogen oxide when exhaust gas generated by the engine is in an oxidizing state, comprising the steps of:

detecting parameters, including at least an engine speed and an engine load, indicative of operating conditions of the engine;

determining a temperature of the catalyst;

discriminating whether an air/fuel ratio to be supplied to the engine is controlled to a value in a lean direction;

comparing the temperature of the catalyst with a reference temperature; and inhibiting the air/fuel ratio to be controlled in the lean direction when the temperature of the catalyst is not less than the reference temperature.

16. A method according to claim 15, determining the temperature of the catalyst by calculating the temperature based on at least one of the detected parameters and the air/fuel ratio.

17. A method according to claim 16, calculating the temperature of the catalyst based on at least a specific heat, a heat transfer coefficient and an exhaust temperature determined based on an engine speed, an engine load and the air/fuel ratio.

18. A method according to claim 15, determining the temperature of the catalyst by detecting the temperature through a sensor.

19. A computer program embodied on a computer-readable medium for purifying exhaust gas of an internal combustion engine having a catalyst in an exhaust system of the engine, said catalyst being a selective-reducing type nitrogen oxide reduction catalyst composed of a heat resistant inorganic oxide substrate (monolith) and iridium borne on the substrate (monolith) as an active material (substance) and reducing nitrogen oxide when exhaust gas generated by the engine is in an oxidizing state, comprising the steps of:

detecting parameters, including at least an engine speed and an engine load, indicative of operating conditions of the engine;

determining a temperature of the catalyst; and controlling an air/fuel ratio, to be supplied to the engine in response to at least one of the detected parameters and the determined temperature of the catalyst, to a value in a lean direction when the determined temperature of the catalyst is within a predetermined range, and to a value in a rich direction, which is not more than a stoichiometric air/fuel ratio, when the determined temperature of the catalyst is outside of the predetermined range.

20. A computer program embodied on a computer-readable medium for purifying exhaust gas of an internal combustion engine having a catalyst in an exhaust system of the engine, said catalyst being a selective-reducing type nitrogen oxide reduction catalyst composed of a heat resistant inorganic oxide substrate (monolith) and iridium borne on the substrate (monolith) as an active material (substance) and reducing nitrogen oxide when exhaust gas generated by the engine is in an oxidizing state, comprising the steps of:

detecting parameters, including at least an engine speed and an engine load, indicative of operating conditions of the engine;

determining a temperature of the catalyst;

discriminating whether an air/fuel ratio to be supplied to the engine is controlled to a value in a lean direction;

comparing the temperature of the catalyst with a reference temperature; and inhibiting the air/fuel ratio to be controlled in the lean direction when the temperature of the catalyst is not less than the reference temperature.

* * * * *